Figure 1:
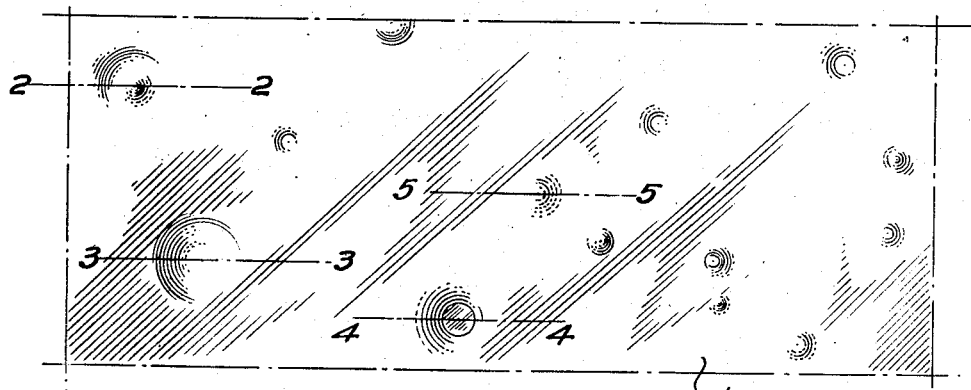

Aug. 11, 1953   F. R. SPENCER   2,648,642
MEDIUM OIL ALKYD RESIN SURFACE COATING MATERIALS
AND PROCESSES FOR PREPARING THE SAME
Filed Jan. 21, 1950

INVENTOR
FRANK R. SPENCER,
BY
James T. Dunn
ATTORNEY

Patented Aug. 11, 1953

2,648,642

UNITED STATES PATENT OFFICE 2,648,642

MEDIUM OIL ALKYD RESIN SURFACE COATING MATERIALS AND PROCESSES FOR PREPARING THE SAME

Frank R. Spencer, Stamford, Conn., assignor to American Cyanamid Company, New York, N. Y., a corporation of Maine Application January 21, 1950, Serial No. 139,806

12 Claims. (Cl. 260—21)

This invention relates to compositions of matter comprising melamine-aldehyde resins, a medium oil alkyd resin and a small amount of a modifying polymer of an aliphatic ester of an alpha,beta unsaturated carboxylic acid. This invention further relates to compositions of matter comprising homogeneous blends of from 10–50 parts of a melamine-aldehyde or urea-aldehyde resin, from 90–50 parts of a medium oil alkyd resin and from 0.05 to 5.0% by weight of a polymeric aliphatic ester of an alpha,beta unsaturated carboxylic acid. This invention still further relates to compositions of matter comprising compatible blends of from 20–40 parts of a melamine-aldehyde or urea-aldehyde resin and from 80–60 parts of a medium oil alkyd resin and from 0.05 to 10.0% of polymeric aliphatic ester of an alpha,beta unsaturated carboxylic acid. Additionally, this invention relates to coating compositions which are capable of yielding, on baking, a non-crawling or non-cratering film comprising compatible blends of a melamine-aldehyde or urea-aldehyde resin, a medium oil alkyd resin and a modifier such as polybutyl acrylate or polybutyl fumarate and a solvent.

One of the objects of the instant invention is to produce a coating composition which is capable of producing, on baking, a non-crawling film. A further object of the instant invention is to produce a coating composition with improved alkali resistance while still avoiding the defect of cratering or crawling, by incorporating into a compatible blend of melamine-aldehyde resin, a medium oil alkyd resin, a small portion of polymeric aliphatic ester of an alpha,beta unsaturated carboxylic acid. Other objects of the instant invention will be set forth hereinbelow in greater detail.

In the preparation of these compositions, the alkyd resin utilized is a medium oil alkyd which is defined as an alkyd resin which has been modified by 26% to 50% by weight of oil based on the total alkyd resin. The alkyd resins which may be used in the practice of the process of the instant invention are those which are conventionally prepared by use of a polycarboxylic acid and a polyhydric alcohol in which the acid may be a saturated acid or an alpha, beta unsaturated acid but preferably those which are saturated. The melamine-aldehyde resins utilizable in the preparation of the compositions of the instant invention may be prepared by reacting melamine or urea with an aldehyde such as formaldehyde, acetaldehyde, benzaldehyde, furfural and the like. The mol ratio of the melamine to aldehyde may be varied over a fairly wide range such as mol ratios of 1:1 to 1:6, respectively, but preferably those which have mol ratios of 1:2–1:3, respectively. The mol ratio of the urea to aldehyde may be varied within the range of 1:1 to 1:4 but preferably 1:2–1:3, respectively.

The melamine resin, medium oil alkyd resin mixtures have many desirable features for use in coating compositions but at the same time have other characteristics which make them desirable for use alone in coating compositions. As advantages, the melamine-medium oil alkyd resin mixtures produce films which are hard, glossy, and alkali and acid resistant, resistant to solvents, resistant to degradation due to light and heat, flexible, whereas one of the disadvantages is in the tendency of the films to "crawl" or "crater." The applicant has discovered that these resinous mixtures can be modified by the addition of polymeric aliphatic esters of alpha, beta unsaturated carboxylic acids, so that they display no cratering whatever when used as surface coating compositions. This cratering defect is not solely limited to surface coating compositions but is to be found in molded products and in other applications in which the resinous material has an exposed surface area.

Figure 2:
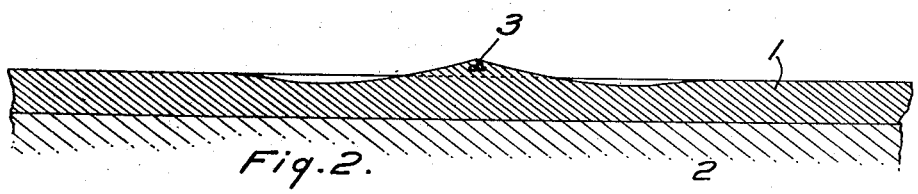
Figure 3:
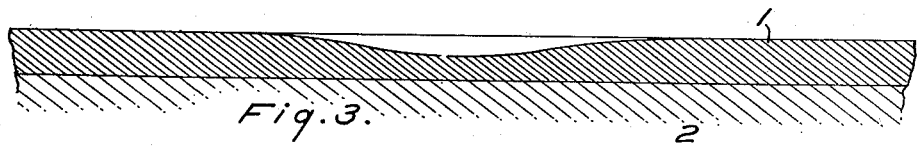
Figure 4:
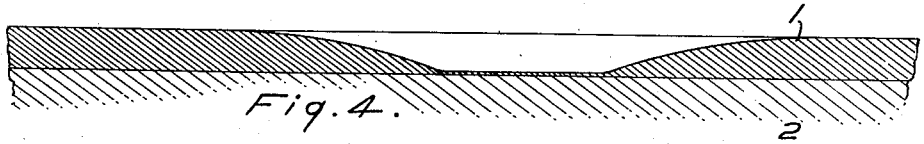
Figure 5:
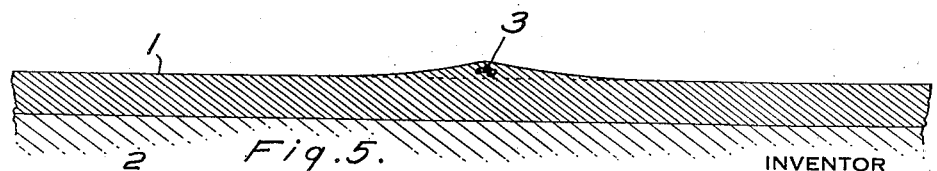

In the drawing, there are shown various types of cratering, crawling, and pin-holing defects, which are to be found when the medium oil alkyd resins in admixture with melamine or urea resins are used as surface coating materials, without the use of the anti-cratering materials which I have found to be capable of eliminating these defects. Fig. 1 is a top plan view of a coated surface showing various crater-like defects. Fig. 2 is an enlarged scale cross sectional view of the line 2, 2 of Figure 1 showing a typical crater-like depression due to the presence of a piece of lint, dust, or other foreign body on the surface of the substratum or in the film forming material at the time of the application of the surface coating material. Sometimes these foreign bodies attach themselves to the films after they have been applied and cause protuberances. Fig. 2 shows the surface coating material can build up into a protuberance extending above the average plane surface of the coating material with depression below and each side of said protuberance. It will be readily seen that these depressions are emphasized when reflected light emitting from the curved surfaces of the depressions meets the eye. Fig. 3 shows an enlarged scale cross-sectional view of the line 3, 3 of Fig. 1 showing a slight depression in the surface of the coating material. Reflected light emphasizes the size of a crater of this type and makes it an undesirable and very noticeable defect. Fig. 4 shows an enlarged scale cross-sectional view of the line 4, 4 of Figure 1 showing an aggravated crater-like depression in the surface coating material wherein the lowermost part of the crater shows an extremely thin film of coating material superimposed on the substratum base. Again in this instance reflected light emphasizes the dimensions of the crater and detracts considerably from the appearance of the film generally. Fig. 5 shows an enlarged scale cross sectional view of the line 5, 5 of Fig. 1 showing a protuberance caused by the presence of a piece of lint, dust, or other foreign body on the surface of the base material or in the surface coating material at the time of the application of the coating material. In contradistinction with Fig. 2, it will be noted that the type of defect shown in Fig. 5 causes a protuberance in the surface coating material but does not cause the depressions on each side of the protuberance as was the case in Fig. 2. In the Figs. 2, 3, 4, and 5, the reference numeral 1 represents the surface coating material; 2 represents the base to which the surface coating material is applied. In the Figs. 2 and 5, the No. 3 represents a foreign body such as a piece of lint, dust, or the like. These unsightly crater-like depressions, shown in Figs. 2, 3, and 4 can be completely eliminated or very substantially diminished by incorporating into the surface coating materials of the present invention small amounts of a polymeric aliphatic ester of an alpha, beta unsaturated carboxylic acid. The effect, for example, would be to change the defect from that shown in Fig. 2 to that shown in Fig. 5. The defect shown in Fig. 2 is not readily correctable by ordinary surface treating means such as by sanding or polishing or both. In contradistinction, however, the defect as shown in Fig. 5 is readily correctable by ordinary surface treating means.

In the preparation of the medium oil alkyd resin, one may modify the resin by use of oils, oil acid esters, or oil acids of the drying, semi-drying, or none-drying oil classes although it is actually preferred that the semi-drying or non-drying oils be used. There is little or no advantage to be derived in using exclusively the drying oils, although they may be used where, for example, color retention on baking is not as important as adhesion.

In the preparation of these alkyd resins, one may use the saturated polycarboxylic acids or the unsaturated polycarboxylic acids. Amongst those saturated polycarboxylic acids which may be used in the practice of the process of this invention are oxalic, malonic, succinic, glutaric, sebacic, adipic, pimelic, suberic, azelaic, tricarballyic, citric, tartaric, and maleic. Phthalic acid and terepthalic acid may also be used in the preparation of the alkyd resins in the same proportions as the saturated polycarboxylic acids. Additionally, one may use such unsaturated acids as maleic, fumaric, itaconic, citraconic, and the like. These acids and other comparable acids, their esters, and their anhydrides may be used in the preparation of these alkyd resins. Obviously, these acids may be used either singly or in combination with one another.

In the preparation of the alkyd resin, the conventional polyhydric alcohols may be used such as ethylene glycol, diethylene glycol, dimethylene glycol, tetramethylene glycol, pinacol, trimethylol propane, trimethylol ethane, mannitol, dulcitol, sorbitol, glycerol, pentaerythritol, dipentaerythritol, and the like. The polyhydric alcohols may be used either singly or in combination with one another in the esterification reaction in the preparation of the alkyd resin.

In the esterification reaction between the polycarboxylic acid and the polyhydric alcohol in the formation of the alkyd resin, it is possible to use a polyhydric alcohol in equimolecular proportions with the polycarboxylic acid. There are instances, however, in which it is desired to use as much as 50% in excess of the amount of polyhydric alcohol that theoretically is required to esterify completely the polycarboxylic acid. The excess of alcohol in the reaction mixture is desirable in order to produce, in a reasonably short time, a comparatively low acid number in the esterification product.

In the preparation of the oil modified alkyds to be used in the instant invention, one may use such oils as castor oil, linseed oil, chaulmoogra oil, cherry kernel oil, cod liver oil, corn oil, hemp seed oil, grape seed oil, hazel nut oil, candlenut oil, lard oil, soya oil, coconut oil, cottonseed oil, tung oil, perilla oil, oiticica oil, fish oil, olive oil, peach kernel oil, peanut oil, pistachio nut oil, rape seed oil, and the like. It has been set forth hereinabove that the use of the polymeric aliphatic esters of alpha,beta unsaturated carboxylic acids in modifying these resinous compositions in particularly useful when the oil modifier is a non-drying or a semi-drying oil or the acids derived therefrom. In order that the instant invention may be completely understood, the following examples showing the method of preparing medium oil alkyd resins are set forth hereinbelow. These examples are by way of illustration only and are not to be interpreted as limitations on the case except as indicated by the appended claims. All parts are parts by weight.

*Resin A*

94 parts of glycerin, 148 parts of phthalic acid anhydride, and 120 parts of soya bean oil fatty acids are introduced into a suitable reaction chamber and are heated to about 210–230° C. until condensation is essentially complete. The resin has an acid number of 6–7 and a viscosity of $Z_1$ to $Z_3$ on the Gardner-Holdt scale at 25° C. when dissolved in an equal weight of xylene. The resin thus produced contains about 33 to 36% oil acids based on the total resin solids.

*Resin B*

148 parts by weight of phthalic acid anhydride, 98 parts of glycerin, and 98 parts of coconut oil, fatty acids are introduced into a suitable reaction chamber and there heated gradually to about 210–230° C. and the mixture is held at this temperature until condensation is substantially complete and until an acid number of about 4–8 is reached. A solvent, such as xylene, is then added in a sufficient amount to adjust the solids content to about 60% whereupon the viscosity at 25° C. is about $Z_4$–$Z_6$ on the Gardner-Holdt scale. The resin thus produced contains about 29–32% oil acids based on the total resin solids.

The following example is given to illustrate a conventional method of preparing the melamine-aldehyde resins. Specific enumeration of detail is given by way of illustration only and various modifications known to those skilled in the art may be incorporated into the process. All parts are parts by weight.

Resin C

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Resin D 3370 parts of 37% formaldehyde solution were charged to a suitable reaction vessel and neutralized to pH 8.6 with 20% sodium hydroxide, and there were then added 6 parts of 85% phosphoric acid. The mixture was heated to 70° C. and 1200 parts of urea were added over a period of an hour. The mixture was then heated to 85° C. and held at that temperature for one hour. 1340 parts of butanol were added and the mixture heated to reflux and held for one hour at reflux. 1550 more parts of butanol were added and the mixture distilled with replacing feed of dry butanol until a batch temperature of 112° C. was reached. The batch was then vacuum concentrated at 90° C. to approximately 65% resin solids. This solution was diluted with xylene and butanol to give a final composition of 20% xylene, 30% butanol, and 50% resin solids.

The butylated melamine-formaldehyde resin or the butylated urea-formaldehyde resin thus produced are well suited for blending with the medium oil modified alkyd resins such as those prepared according to the process set forth hereinabove under example Resin A or Resin B. These blends of resins are useful as baking enamels and the following formulation is set forth for the purpose of illustrating such an enamel.

Enamel 1

Incorporate by a suitable grinding, 40 parts of medium chrome green into 200 parts (50% solids solution) of a mixture of (a) a phthalic alkyd type resin comparable to that produced according to the process set forth hereinabove under Resin A but containing 48% of drying oils and (b) butylated methylol melamine. The alkyd resin and melamine resin being present in a weight ratio of 90-10, respectively, the alkyd resin being dissolved in xylene and the melamine resin being dissolved in butanol. The resulting enamel may be thinned out with more xylene until it has a viscosity of about 0.65 poise and sprayed on the metal to be coated. The coated metal may then be baked for 30 minutes at 250° F.

As modifiers for the alkyd resins in the preparation of these coating resins it is possible to use in the place of the melamine-aldehyde resins other resinous materials such as urea-aldehyde condensation products having mol ratios from 1:1 to 1:4. In the preparation of the additives, i. e., materials to be added to the alkyd resins, it is actually preferred that the melamine and/or urea resins be alkylated with primary aliphatic alcohols having not more than 12 carbon atoms. It is preferred for optimum results to use the butylated melamine-formaldehyde resin and/or butylated urea-formaldehyde resins in the preparation of surface coating materials. The reason for this is to maintain the most desirable hydrocarbon tolerance of the resinous mixture in solvent.

In the preparation of these coating compositions, it is conventional to use an organic solvent for the resin mixture. Among the solvents which may be used are acetone, butyl acetate, butyl carbitol, isobutyl ketone, dioxane, ethylene glycol, ethyl lactate, ethyl acrylate, ethyl acetate, isophorone, methyl-ethyl ketone, methyl isobutyl ketone, styrene, tetrachloroethylene, xylene, and other aromatic and aliphatic hydrocarbon solvents, and the like. The amount of solvent which may be used can be varied considerably from no solvent up to about 200% solvent based on the total weight of the resin solids.

As pigments one may use a great variety of pigments depending on the particular coloration desired and in the use and preparation thereof, one may utilize pigments in conventional amounts varying from no pigment for clear varnishes and lacquers up to 200% by weight of pigment based on the total weight of the resin as an approximate maximum. Amongst pigments that may be used are white lead, zinc oxide, titanium dioxide, lithopone, antimony oxide, prussian blue, carbon black, chrome yellow, chrome orange, and the like.

Amongst the materials to which these coating compositions may be applied are such substrata metals as aluminum, zinc, tin, iron, bonderized steel, copper, nickel chromium, lead, and chromadized Dow metal. They are additionally applicable to wood, glass, and the like.

The polybutyl acrylate used in the composition of the instant invention may be readily prepared according to the following process:

Modifier A

About 160 parts of a suitable solvent, such as benzene, are introduced into a suitable reaction chamber and are heated until temperature of about 90 to 100° C. is reached. 240 parts of the monomeric ester, butyl acrylate admixed with 0.5% of benzoyl peroxide is then introduced into the heated solvent dropwise, and the mixture is continuously heated under slight reflux. After the monomer has been completely added to the solvent, the reaction mixture is heated for a two hour period until the temperature becomes comparatively steady. Solids determinations may be made at regular intervals and when the total solids content is within the range of 50% to 70% the heating can be discontinued. This polymer may be then further diluted to low concentrations such as concentrations of 10 to 20% solids or less as desired by the addition of more solvent. The polybutyl acrylate solution thus prepared is ready for use in the composition of the instant invention.

In order to prepare the polybutyl fumarate, a method of preparation comparable to that used for the polybutyl acrylate can be adopted.

*Modifier B*

The monomeric dibutyl fumarate is introduced into a suitable reaction chamber with a small amount of benzoyl peroxide and is heated until a temperature of 80° to 100° C. is reached. This heating is continued at that temperature range until the viscosity becomes substantially constant. This heating will require from 6 to 10 hrs. It is not necessary, however, in the preparation of the polybutyl fumarate to utilize a solvent although if one desires to do so, it is possible to accomplish this fact. Instead of the benzoyl peroxide catalyst, it is possible to substitute a great variety of other catalysts which are well known to those skilled in the art. For instance, one may utilize ditertiary butyl peroxide, which is a high temperature catalyst, and in the use of such a catalyst, one may heat the fumarate from 130 to 160° C. until the viscosity became constant and this would require a time interval of between 6 and 10 hrs.

*Modifier C*

A quantity of dipropyl fumarate is introduced into a suitable reaction chamber with a small amount (0.5% by weight) of benzoyl peroxide and the charge is heated until a temperature of 80° C.–100° C. is reached. The heating is continued at that temperature range until the viscosity becomes substantially constant. This generally requires heating for from 6 to 10 hours. The resultant polymer may be diluted to any desired solids concentration with a suitable organic solvent.

The modifiers which may be used in the practice of the process of this invention to prevent the occurrence of cratering in coating compositions comprising alkyd resins in admixture with melamine resins are the polymers of the aliphatic esters of alpha, beta unsaturated carboxylic acids. The alpha, beta unsaturated carboxylic acids which may be used in the preparation of the esters may be either monocarboxylic acids or polycarboxylic acids but it is unnecessary that the unsaturation in these acids be between the alpha, beta carbon atoms. To prepare the esters, one may use such acids as acrylic, crotonic, isocrotonic, methyl acrylic, fumaric, maleic, glutaconic, ditraconic, itaconic, and the like. The method of preparing the polymers of these esters has been set forth hereinabove with respect to the polybutyl acrylate, polybutyl fumarate, and polypropyl fumarate and the preparation of the other polymers may be accomplished by a comparable procedure. One may use any polymer up to and including those whose polymerization has been permitted to continue until they reach a stage just short of complete incompatibility with the resinous mixture dissolved in solvent. Any slight incompatibility between the high molecular weight polymer of the lower alkyl esters of the alpha, beta unsaturated carboxylic acids and the resinous solution is of no appreciable consequence and these high molecular weight polymers may be utilized throughout the range of increasing incompatibility and up to that point wherein complete incompatibility is reached between the polymers of the alpha, beta acid esters and the resinous solutions. Mixtures of the polymers with each other and with the monomer may be utilized. Although the ethyl, propyl, amyl, and higher alkyl esters produce a decided improvement in inhibiting cratering in these resinous coating compositions, the butyl esters actually produce results particularly the polybuyl esters of acrylic and fumaric acids. These latter two, polybutyl acrylate and polybutyl fumarate, have produced optimum results in the elimination of cratering in these enamel coating compositions. The amount of these polymers of the lower alkyl esters of alpha, beta unsaturated carboxylic acids which may be used to modify the melamine resin alkyd resin mixture may be varied over a fairly wide range such as 0.05% to 10% by weight of the polymer based on the total weight of the resin solids. When using the lower molecular weight polymers, it is desirable to use 5%–10% of the polymer, whereas in the use of the high molecular weight polymers, it is possible to use very small amounts such as 0.05%–1.0% in order to avoid the tendency of the enamels to crater. It is actually preferred that one use between 0.1% and 5% of the polymers with 0.5% of a fairly high molecular weight polymer producing optimum results. In the use of the polybutyl acrylate as a modifier, 0.5% of the polymer having a molecular weight of 3000 to 7500 produces excellent results.

In order to present a representative picture of the relative merits of coating compositions prepared in keeping with the applicant's discovery, namely, those modified with a polymer of an aliphatic ester of an alpha, beta carboxylic acid, compared with those coating compositions containing no added polymer, the following procedure was established.

An enamel of the following composition was prepared. All parts are parts by weight.

*Enamel B*

Incorporate by a suitable grinding, 100 parts by weight of an anatase titanium pigment into a mixture of (a) 134 parts by weight of a phthalic alkyd type resin (50% solids) such as that prepared according to the process set forth hereinabove under Resin A but containing 34% semi-drying oil acids dissolved in xylene and (b) 66 parts by weight of a butylated methylol malamine (50% solids) and dissolve in a mixture of xylene and butanol in substantially equal parts by weight. The resulting enamel may be thinned with additional xylene until it has a viscosity at 25° C. of 0.65 poise and sprayed on the metal to be coated. The coated metal may then be baked for 30 minutes at 300° F.

I claim:

1. A composition of matter comprising a compatible blend of about 10–50 parts of an aminoplast resin selected from the group consisting of melamine-aldehyde resins and urea-aldehyde resins, about 90–50 parts of an alkyd resin modified with 26%–50% by weight of a material selected from the group consisting of semi-drying glyceride oils, nondrying glyceride oils and the fatty acids derived therefrom and 0.5% to 10% by weight of a modifier comprising a polymeric alkyl ester of an alpha, beta unsaturated carboxylic acid.

2. A composition of matter comprising a compatible blend of about 10–50 parts of a melamine-aldehyde resin, about 90–50 parts of an alkyd resin modified with 26%–50% by weight of a material selected from the group consisting of semi-drying glyceride oils, non-drying glyceride oils and the fatty acids derived therefrom and 0.05% to 10.0% by weight of a modifier comprising a polymeric alkyl ester of an alpha, beta unsaturated carboxylic acid, said percentage of modifier being based on the total weight of the resin solids.

3. A composition of matter comprising a compatible blend of about 20–40 parts of a melamine-aldehyde resin, about 80–60 parts of an alkyd resin modified with 26%–50% by weight of a material selected from the group consisting of semi-drying glyceride oils, non-drying glyceride oils and the fatty acids derived therefrom, and 0.05 to 10.0% by weight of a modifier comprising a polymeric alkyl ester of an alpha, beta unsaturated carboxylic acid, wherein said percentage of modifier is based on the total weight of the resin solids.

4. A composition of matter comprising a compatible blend of about 20–40 parts of a melamine-aldehyde resin, about 80–60 parts of an alkyd resin modified with 26%–50% by weight of a material selected from the group consisting of semi-drying glyceride oils, non-drying glyceride oils and the fatty acids derived therefrom, and about 0.5% by weight of a modifier comprising a polymeric alkyl ester of an alpha,beta unsaturated carboxylic acid, wherein said percentage by weight of the modifier is based on the total weight of the resin solids.

5. A coating composition, capable of yielding on baking a crater-free film, comprising a compatible blend of about 10–50 parts of a melamine-aldehyde resin, 90–50 parts of an alkyd resin modified with 26–50% by weight of a material selected from the group consisting of semi-drying glyceride oils, non-drying glyceride oils and the fatty acids derived therefrom and 0.05 to 5.0% by weight of a modifier comprising a polymeric alkyl ester of an alpha,beta unsaturated carboxylic acid, wherein said percentage by weight of the modifier is based on the total weight of the resin solids, and a solvent.

6. A coating composition, capable of yielding on baking a crater-free film, comprising a compatible blend of about 20–40 parts of a melamine-aldehyde resin about 80–60 parts of an alkyd resin, modified with 26%–50% by weight of a material selected from the group consisting of semi-drying glyceride oils, non-drying glyceride oils and the fatty acids derived therefrom, about 0.05 to 5.0% by weight of a modifier comprising a polymeric alkyl ester of an alpha,beta unsaturated carboxylic acid wherein said percentage by weight of the modifier is based on the total weight of the resin solids and a solvent.

7. A coating composition, capable of yielding on baking a crater-free film comprising a compatible blend of 20–40 parts of a melamine-aldehyde resin, about 80–60 parts of an alkyd resin, modified with 26–50% by weight of a material selected from the group consisting of semi-drying glyceride oils, non-drying glyceride oils and the fatty acids derived therefrom, about 0.5% by weight of a modifier comprising a polymeric alkyl ester of an alpha,beta unsaturated carboxylic acid, wherein said percentage by weight is based on the total weight of the resin solids and a solvent.

8. A coating composition, capable of yielding on baking a crater-free film, comprising a compatible blend of about 10–50 parts of a urea-aldehyde resin, 90–50 parts of an alkyd resin modified with 26%–50% by weight of a material selected from the group consisting of semi-drying glyceride oils, non-drying glyceride oils and the fatty acids derived therefrom and 0.05 to 5.0% by weight of a modifier comprising a polymeric alkyl ester of an alpha,beta unsaturated carboxylic acid, wherein said percentage by weight of the modifier is based on the total weight of the resin solids, and a solvent.

9. A coating composition, capable of yielding on baking a crater-free film, comprising a compatible blend of about 20–40 parts of an urea-aldehyde resin about 80–60 parts of an alkyd resin, modified with 26–50% by weight of a material selected from the group consisting of semi-drying glyceride oils, non-drying glyceride oils and the fatty acids derived therefrom, about 0.05 to 5.0% by weight of a modifier comprising a polymeric alkyl ester of an alpha,beta unsaturated carboxylic acid wherein said percentage by weight of the modifier is based on the total weight of the resin solids and a solvent.

10. A coating composiiton, capable of yielding on baking a crater-free film comprising a compatible blend of 20–40 parts of an urea-aldehyde resin, about 80–60 parts of an alkyd resin modified with 26%–50% by weight of a material selected from the group consisting of semi-drying glyceride oils, non-drying glyceride oils and the fatty acids derived therefrom, about 0.5% by weight of a modifier comprising a polymeric alkyl ester of an alpha,beta unsaturated carboxylic acid, wherein said percentage by weight is based on the total weight of the resin solids and a solvent.

11. A coating composition, capable of yielding on baking a crater-free film, comprising a compatible blend of about 10–50 parts of a butylated melamine-aldehyde resin, 90–50 parts of an alkyd resin modified with 26–50% by weight of a material selected from the group consisting of semi-drying glyceride oils, non-drying glyceride oils and the fatty acids derived therefrom, and 0.05 to 5.0% by weight of a modifier comprising a polymeric alkyl ester of an alpha,beta unsaturated carboxylic acid, wherein said percentage by weight of the modifier is based on the total weight of the resin solids, and a solvent.

12. A coating composition, capable of yielding on baking a crater-free film, comprising a compatible blend of about 10–50 parts of a butylated urea-aldehyde resin, 90–50 parts of an alkyd resin modified with 26%–50% by weight of a material selected from the group consisting of semi-drying glyceride oils, non-drying glyceride oils and the fatty acids derived therefrom and 0.05 to 5.0% by weight of a modifier comprising a polymeric alkyl ester of an alpha,beta unsaturated carboxylic acid, wherein said percentage by weight of the modifier is based on the total weight of the resin solids, and a solvent.

FRANK R. SPENCER.

References Cited in the file of this patent

UNITED STATES PATENTS

| Number | Name | Date |
| --- | --- | --- |
| 2,069,983 | Ubben | Feb. 9, 1937 |
| 2,218,474 | Moore | Oct. 15, 1940 |
| 2,246,095 | Graves | June 17, 1941 |
| 2,294,590 | West | Sept. 1, 1942 |
| 2,378,365 | Swain | June 12, 1945 |
| 2,574,659 | Prislin | Nov. 13, 1951 |

FOREIGN PATENTS

| Number | Country | Date |
| --- | --- | --- |
| 555,148 | Great Britain | Aug. 6, 1943 |